UNITED STATES PATENT OFFICE.

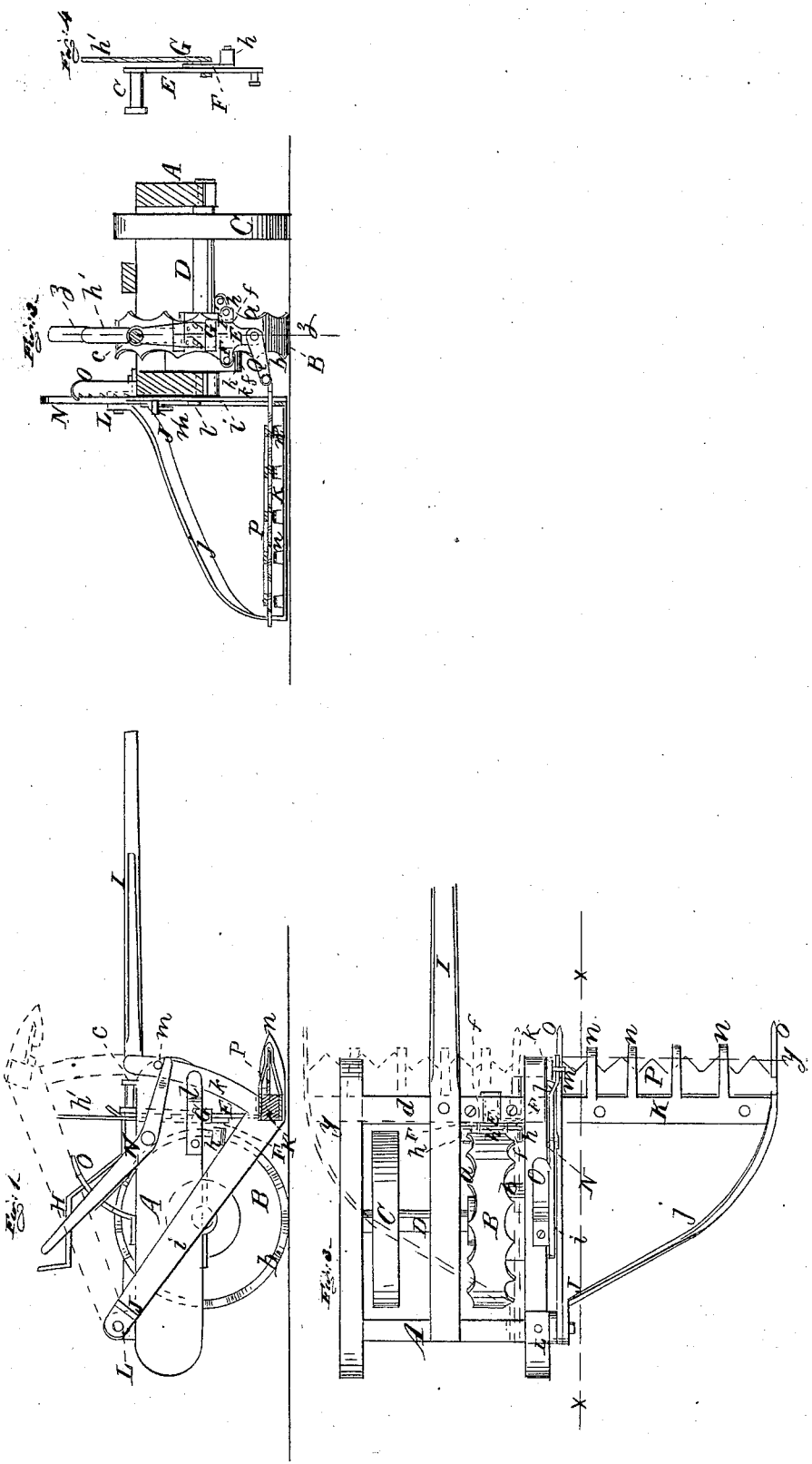

WM. SCHNEBLY AND THOMAS SCHNEBLY, OF HACKENSACK, N. J.

IMPROVEMENT IN HARVESTERS.

Specification forming part of Letters Patent No. 22,203, dated November 30, 1858.

*To all whom it may concern:*

Be it known that we, WILLIAM SCHNEBLY and THOMAS SCHNEBLY, of Hackensack, in the county of Bergen and State of New Jersey, have invented certain Improvements in Grain and Grass Harvesting Machines; and we do hereby declare that the following is a full, clear, and exact description of the same, reference being had to the annexed drawings, making a part of this specification, in which—

Figure 1 is a transverse vertical section of our invention, taken in the line $x\ x$, Fig. 3. Fig. 2 is a longitudinal section of the same, taken in the line $y\ y$, Fig. 3. Fig. 3 is a plan or top view of the same. Fig. 4 is a section of the same, taken in the line $z\ z$, Fig. 2.

Similar letters of reference indicate corresponding parts in the several figures.

This invention consists, first, in a novel means employed for operating or driving the sickle, whereby the same may be readily checked or stopped when desired.

The invention consists, second, in a novel application of the sickle to the machine, whereby the sickle may be raised and lowered and retained at any desired height from the surface of the ground, and also rendered capable of being adjusted on the machine, so as to allow the latter, when not in operation, to be readily moved from place to place.

To enable those skilled in the art to fully understand and construct our invention, we will proceed to describe it.

A represents the main frame of the machine, in which two wheels, B C, are placed, the frame A resting in a balanced or nearly balanced state on the axle D of said wheels. The two wheels B C are placed loosely on their axle D. One of them may, if desired, be secured to the axle. The wheel B is the one which drives the sickle of the machine. This wheel B has each edge of its periphery scalloped, or formed with concaves or grooves, as shown clearly at $a\ b$ in Figs. 2 and 3, the concaves $a$ at one side of the wheel being so placed relatively with those $b$, placed at the opposite side, that the projecting points of one will be in line with the centers of the concaves of the other. The wheel C is of the same diameter as the wheel B. It may, however, be made lighter than the wheel B, and is so disposed or placed on the axle D relatively with the wheel B as to properly support the frame A.

E is a lever, the upper end of which is attached by a fulcrum-pin, $c$, to the front cross-piece, $d$, of the main frame A. This lever is of slightly curved form, extends down in front of the wheel B, and has two bent arms, F F', pivoted to it, one arm, F, being permanently attached to the lever, the other, F', being allowed to work on its pivot. The lower ends of the arms $f$ project outward from each other and at right angles with their other parts, $g$, as shown clearly in Fig. 2.

To the outer end of each arm F a friction-roller, $h$, is attached, and these friction-rollers are kept in contact with the scalloped edges $a\ b$ of the wheel B when the machine is in operation by means of a slide-clasp, G, which encompasses the parts $g\ g$ of the arms, said slide being provided with a shank, $h'$, which extends upward in front of the driver's seat H on the frame A.

I is the draft-pole, attached to the main frame A.

J is a frame, in the front part of which the bar K is fitted. The frame J is formed of two bars, $i\ j$, the back ends of which are connected together and to a universal joint, L, which is attached to the back part of the main frame A. The bar $i$ of the frame J is parallel with the side of the main frame A; but the bar $j$ is curved, as shown clearly in Fig. 2, so as to extend outward to the outer end of the finger-bar M, which is firmly secured between the ends of the bars $i\ j$.

To the front end of the bar $i$ a curved bar, $k$, is attached, said bar working in a proper guide, $l$, attached to the main frame A. The bar $k$ has a pin, $m$, projecting outward from it at right angles, and a lever, N, which is attached to the main frame A, has its outer end passing underneath said pin. (See Figs. 1 and 2.) To the frame A a curved plate, O, is attached, said plate being notched at one side in order to retain the lever at any desired height or point.

P is the sickle, which is fitted and works in the fingers $n$ of the bar M, as usual, or in any proper manner. The sickle is connected at its inner end to the lower end of the lever E by a link or shackle, Q, as shown clearly in Fig. 2. The front ends of the bars $i\ j$ project forward of the finger-bar, and are curved at their bottoms to form shoes $o$.

The operation is as follows: As the machine is drawn along the wheel B, by means of its scalloped edges *a b* and the rollers *h* of the arms F, bearing against said edges, communicates a vibrating motion to the lever E, the side clasp, G, retaining the arms F' in proper position, so that the friction-rollers *h* of both arms will be kept in contact with the scalloped edges *a b* of the wheel B. The movement of the lever E may be varying as regards its length of vibration by having the edges of the wheel B scalloped with larger or shorter concaves. The lever E drives the sickle P by means of the link or shackle Q, and the driver on seat H may at any time stop the motion of the sickle by grasping the shank *h'* and raising the slide-clasp G, so that the roller *h* of the arm F' will be allowed to move out from the scalloped side *a* of the wheel B, as shown in red, Fig. 2. The sickle P is allowed to rise and fall bodily to conform to the inequalities of the ground as the frame J is allowed to work or swing freely from the universal joint L, and the sickle P may be retained at any desired height by placing the back end of the lever N in the proper notch of the plate O. When the machine is to be moved from place to place the link or shackle Q is disconnected from the sickle P, the arm *k* removed from the guide *l*, and the frame J raised, rotated, or turned one-half of a revolution, the joint L being the center of motion, and the frame J is then turned over on frame A, as shown in red, Figs. 1 and 3. The frame J, sickle, and finger-bar are thereby placed entirely out of the way, and the machine may be moved from place to place equally as well as any ordinary vehicle on wheels.

Having thus described our invention, we claim—

1. The arrangement and combination of the pendulous lever E and slide G with the scalloped wheel B, as and for the purposes herein shown and described.

2. Securing the frame J, to which the finger-bar is attached, to the main frame by means of the universal joint L and the bar *k*, fitted in the guide *l* on the main frame, or an equivalent arrangement, so that the sickle may rise and fall bodily to conform to the inequalities of the surface of the ground, and at the same time be rendered capable of being placed directly over the main frame to facilitate the transportation of the machine, substantially as described.

W. SCHNEBLY.
THOS. SCHNEBLY.

Witnesses:
WM. TUSCH,
W. HAUFF.